Nov. 27, 1962 E. VOGT 3,066,211
METHOD AND APPARATUS FOR HEATING THERMOPLASTIC SHEETS
Filed June 3, 1960 3 Sheets-Sheet 1

INVENTOR:
EDMUND VOGT
By *[signature]*
AGENT

Nov. 27, 1962  E. VOGT  3,066,211
METHOD AND APPARATUS FOR HEATING THERMOPLASTIC SHEETS
Filed June 3, 1960  3 Sheets-Sheet 3

INVENTOR:
EDMUND VOGT
By 
AGENT the United States Patent Office 3,066,211
Patented Nov. 27, 1962

3,066,211
METHOD AND APPARATUS FOR HEATING
THERMOPLASTIC SHEETS
Edmund Vogt, Bretzenheimerstrasse 24, Mainz-
Weisenau, Germany
Filed June 3, 1960, Ser. No. 33,830
Claims priority, application Germany June 4, 1959
2 Claims. (Cl. 219—34)

This invention relates to the shaping of thermoplastic synthetic material, and more particularly to a method and apparatus for preheating sheets of thermoplastic synthetic material prior to forming.

The permanent shaping of thermoplastic synthetic sheet material requires the sheets to be heated beyond their softening temperature so that they may be plastically deformed. Preheating foils having a thickness of not more than a few thousandths of an inch does not present a major problem but it is difficult and usually time consuming to heat sheets of a thickness of the order of one quarter of an inch to the required relatively high temperature in a uniform manner.

Known equipment for heating relatively heavy sheet and plate material includes a tunnel oven into which the sheets or plates are individually charged on movable carriers. Sources of infrared thermal radiation are commonly arranged in such a manner as to heat both faces of the sheet or plate simultaneously. Even in ovens having radiation sources of high intensity opposite both faces of the sheet material, the time required for adequate uniform heating may be as high as five minutes. The forming process itself usually does not require more than a small portion of such a period so that the time consumed in preheating the sheets determines the output of the equipment, which is of necessity relatively low. Even at a relatively slow rate of preheating the sheets, the energy input, commonly in the form of electric current, is high and the overall heat efficiency is low. The high current consumption not only makes operation of conventional plants expensive but the heavy electrical wiring and the necessary controls adapted to carry high loads raise the initial cost of the plant.

It is the primary object of this invention to shorten the time cycle of a thermoplastic sheet forming plant.

A more specific object is to shorten the necessary time for heating thermoplastic sheet material to its forming temperature.

Another object is the provision of a method and of apparatus which reduce the energy required for preheating thermoplastic sheet material prior to forming.

It has been found that the common themoplastic synthetic materials, such as the cellulose esters and ethers, polyethylene, polystyrene, acrylics, vinyls and polyamides, are semi-transparent to thermal or infrared radiation. When a sheet of such material is exposed to infrared radiation, only a portion of the energy radiated is absorbed by the material and utilized to heat the sheet. A major portion of the radiation passes through the material and is lost. The invention contemplates exposing one face of a thermoplastic sheet of the type described to a source of infrared radiation and to arrange a reflector plate contiguously adjacent the opposite face of the sheet so as to reflect that portion of the radiation which passed through the sheet against the first mentioned face for a second exposure and absorption of at least a second portion of the radiation.

A preferred material for the reflector plate is aluminum which may be polished by mechanical or chemical methods. An aluminum reflector permits cutting the energy input of the radiation source substantially in half not only without any loss in heating effect but actually with a gain. The afore-described type of equipment including a tunnel oven, when modified according to the present invention, permits adequate preheating of relatively heavy thermoplastic sheets within one minute with a corresponding gain in overall capacity of the forming plant.

According to an additional feature of the invention, the reflector itself may serve as a carrier for supporting the sheet while it is being heated by means of radiant energy. The reflector may additionally be equipped with heating means for providing supplemental thermal energy by conduction.

To prevent sticking of the heated thermoplastic sheet to the smooth reflector surface, the latter is preferably formed with orifices through which compressed air may be admitted to the interface between the plastic sheet and the reflector face when it is desired to separate the sheet from the reflector.

The exact nature of this invention as well as other objects and advantages thereof will be readily apparent from consideration of the following specification relating to the annexed drawing in which.

Figure 1:
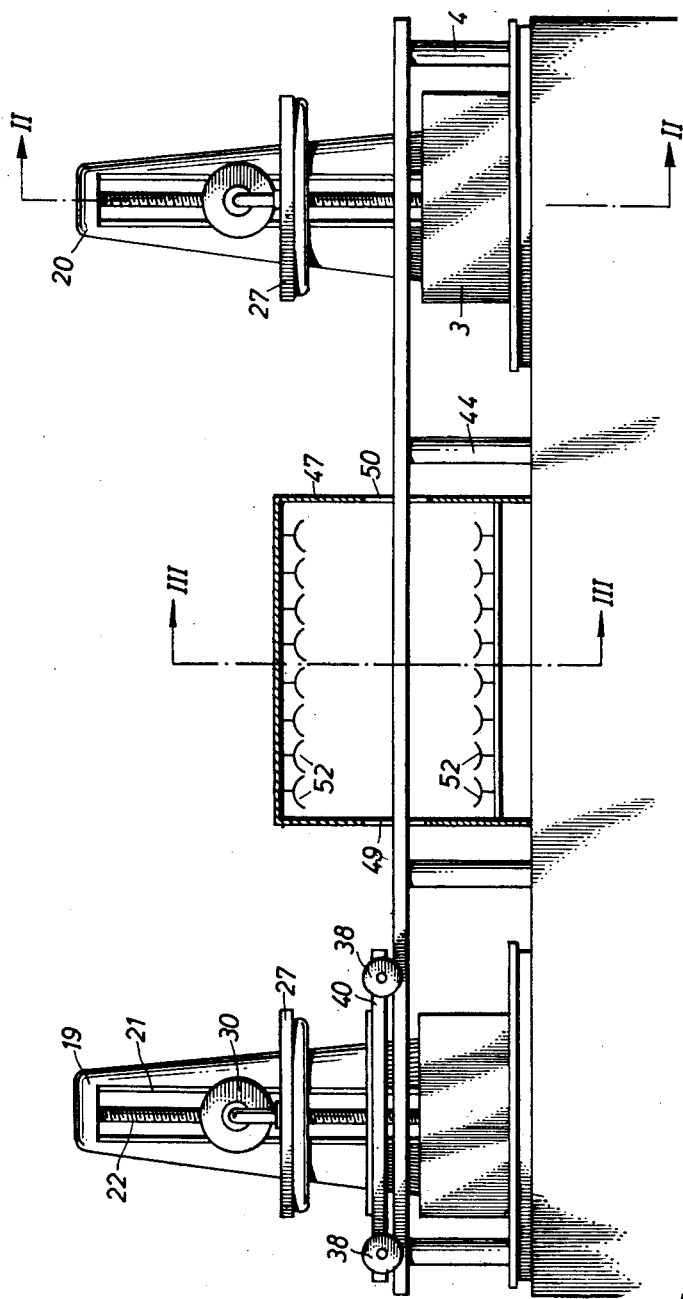
FIG. 1 is a side elevational view, partly in section, of a sheet plastic forming machine equipped with a preferred embodiment of the apparatus of the invention.

Referring now to the drawing, and initially to FIG. 1, there is shown a vacuum molding machine equipped with two mold stations served by a single heating station. The machine is assembled on a box shaped supporting frame 1 which carries two molds 2 and 3. An upright support 19, 20 is mounted on the frame 1 adjacent each of the molds and carries a plate 27. The plate is mounted on its upright support movable in a vertical direction along guide members 21. Movement of the plate is actuated by a rotatable threaded spindle 22 as will be described in more detail hereinafter.

A track including a rail 37 is mounted on frame 1 by means of standards 44 and extends from a position intermediate mold 2 and its coordinated plate 27 to another position intermediate mold 3 and the corresponding plate mounted on the upright support 20. The central portion of the track passes through a housing 47 by way of entrance and exit openings 49 and 50. Infrared radiant heating elements 52 are arranged in housing 47 spacedly above and below the track.

A carriage plate 40 equipped with wheels 38 is mounted on the track for movement between the terminal positions above molds 2 and 3 and through housing 47.

Figure 2:
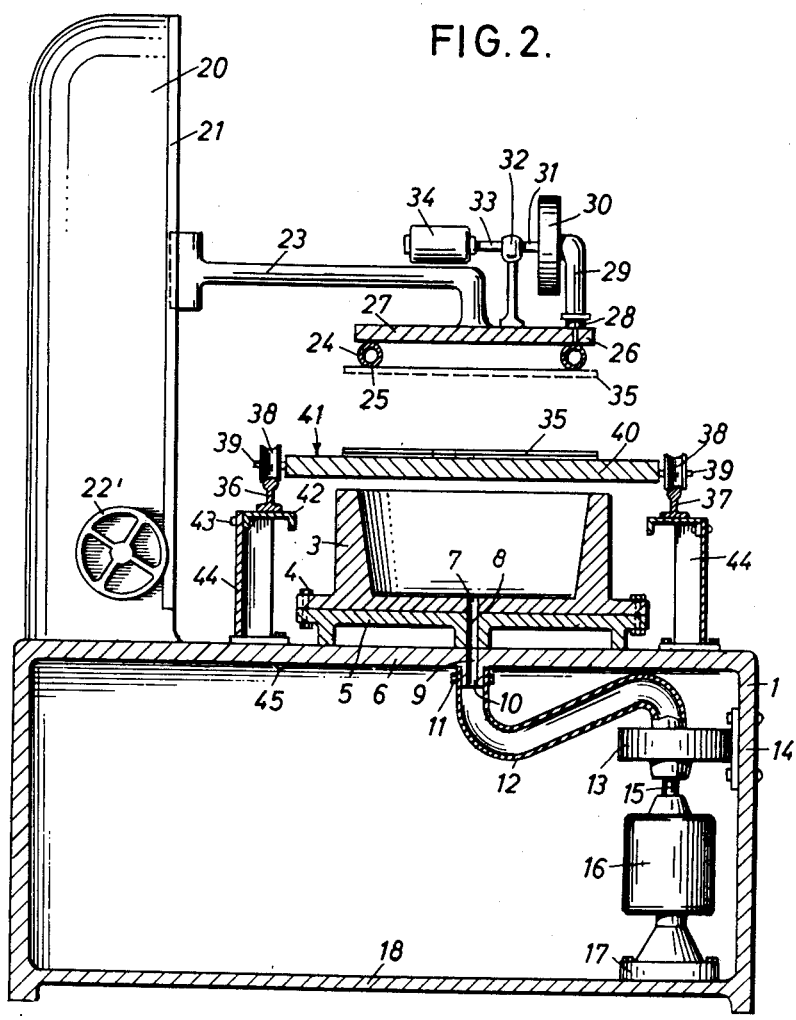
FIG. 2 shows the apparatus of FIG. 1 in front elevational section on the line II—II.

FIG. 2 shows mold 3, upright 20 and associated members of the vacuum molding machine of FIG. 1 in front elevational section on the line II—II. It will be understood that the molding station associated with mold 2 of FIG. 1 is substantially identical with that of mold 3 shown in detail in FIG. 2.

The mold 3 is secured to a support 5 by means of bolts 4. The support 5 is integral with or otherwise fixedly fastened to top plate 6 of frame 1. Communicating bores 7, 8 and 9 in the bottom of mold 3, support 5 and the top plate 6 terminate in a nipple 10 located within frame 1. A flexible tube 12 is secured to nipple 10 by means of a pipe clamp 11 and is attached to the intake of a vacuum pump 13 which is mounted on a side wall 14 of frame 1. The pump is directly coupled to output shaft 15 of electric motor 16, the pedestal 17 of which is flanged to bottom plate 18 of frame 1. When a thermally softened sheet of plastic is placed over the rim about the open end of mold 3 and the mold is evacuated by pump 13, atmospheric pressure forces the sheet into mold 3 into abutting engagement with the mold walls so that the sheet assumes the shape of the mold walls, as is well known.

The upright support 20 carries guide members 21 between which a movable bracket 23 is guided in a vertical path. An extension of the bracket (not shown) threadedly engages spindle 22. Rotation of the spindle is actuated by a handwheel the movement of which is transmitted to the spindle by gears (not shown).

The bracket 23 carries a horizontal support plate 27 to the underside of which an annular tube 24 is attached. The tube 24 has a large number of radially downwardly directed perforations 25. The interior of tube 24 communicates with a bore 26 in plate 27 which terminates in a nipple 28 to which one end of a flexible pipe 29 is fastened. The other end of pipe 29 is connected to the intake of a vacuum pump 30 which is mounted on bracket 23. The shaft 31 of pump 30 is supported in a pillow block 32 and is coupled to output shaft 33 of an electric motor 34, also mounted on bracket 23.

The bracket 23 and the devices mounted thereon constitute means for transferring a plastic sheet 35 to and from mold 3. The vacuum formed by the pump 34 holds the sheet to the orifices of perforations 25 in tube 24 as indicated in broken lines in FIG. 2.

A track formed by rails 36 and 37 is mounted on standards 44 by means of channels 42 and bolts 43. The standards are secured to frame 1 by bolts 45. The track 36, 37 passes at a small distance above mold 3. A carriage plate 40 is provided with wheels 38 on axles 39 and travels along track 36, 37. The top face 41 of carriage plate 40 is of highly polished aluminum and carries a plastic sheet 35.

A plastic sheet 35 fed to the molding station by carriage plate 40 is taken off the carriage by the suction in tube 24 which is lowered for this purpose by rotation of handwheel 22'. The bracket 23 is then raised with the plastic sheet, carriage 40 is charged with a new sheet and removed so that the first sheet may be placed on mold 3 by lowering bracket 23, and vacuum forming may commence.

Figure 3:
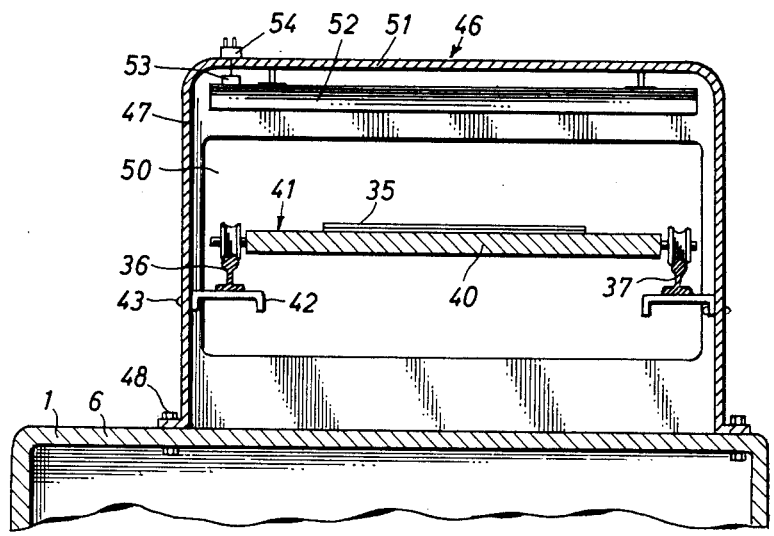
FIG. 3 illustrates the apparatus of FIG. 1 in fragmentary front elevational section on the line III—III.

The heating oven 46 of the molding machine of the invention is shown in greater detail in FIG. 3 which is a front-elevational sectional view of the apparatus of FIG. 1 taken on the line III—III.

The housing 47 of oven 46 is mounted on top plate 6 of the frame 1 by means of a bolted flange connection 48. Rails 36, 37 are held in position by means of channels 42 which are fastened to the side walls of the housing by bolts 43. The entrance and exit openings 49 and 50 in the walls of housing 47 facing the molding stations are of sufficient size to permit passage of carriage plate 40 and of its load.

Infrared heating elements 52 are suspended from cover plate 51 of housing 47. A second set of heating elements shown in FIG. 1 below the level of track 36, 37 is removable and has been omitted from the showing of FIG. 3. The heating elements 52 are equipped with a connector 53 for receiving electric current from a plug 54. The circuit of heating elements 52 also includes switches and other controls for selectively energizing one or several of heating elements 52.

Figure 4:
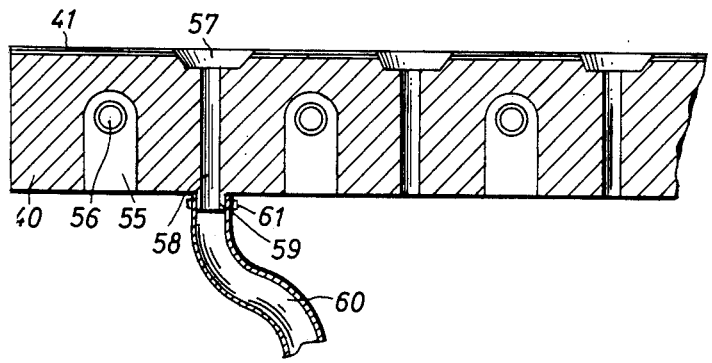
FIG. 4 shows a detail of the apparatus of FIGS. 2 and 3 on an enlarged scale.
Figure 4:

FIG. 4 shows carriage plate 40 on an enlarged scale for better representation of structural details. The reflecting face 41 of carriage plate 40 is made of a material selected for its reflective properties only, such as polished aluminum or aluminum alloy, whereas the remainder of plate 40 is of different material chosen for its mechanical properties. The plate 40 is formed with a plurality of downwardly open recesses 55 in which electric resistance heating elements 56 are embedded. The thermal output of heating elements 56 is transmitted to plate 40, and hence by conduction to a plastic sheet 35 carried on reflective face 41.

The face 41 and contiguous portions of plate 40 are formed with recesses 57 which communicate with vertical ducts in plate 40. A flexible pipe 60 is connected to each of the ducts by means of a nipple 59 and a pipe 61. In order not to crowd FIG. 4, only one such connection is illustrated. The pipe 60 is connected to a source of pressure fluid, such as compressed air.

The afore-described device is operated as follows:

The carriage plate 40 is charged with a sheet 35 of plastic material when in the position illustrated in FIG. 1. The transfer device mounted on bracket 23 is in the raised position. The carriage plate 40 is moved into oven 46, heating elements 52 and 56 are energized and the temperature of sheet 35 is raised to the softening point of the material. Heat from the radiant source is absorbed by sheet 35 during a first passage of the beam of radiation emitted by the heating elements, and again during a second passage of the reflected radiation upward from reflector face 41. Additional thermal energy may be supplied to the sheet from heating elements 56 by conduction if necessary but these heating elements have their greatest utility in preventing cooling of the sheet during the subsequent step, and freezing thereof to carriage plate 40.

The carriage plate then continues its movement from the left toward the right, as viewed in FIG. 1, until it is positioned above mold 3. The transfer device mounted on upright support 20 is lowered into contact of its annular tube 24 with heated sheet 35. The tube is evacuated and the sheet is lifted from carriage plate 40 by raising the transfer device. A new sheet of plastic material is placed on carriage plate 40 which is then moved toward the left, as seen in FIG. 1 into oven 46.

The transfer device on bracket 23 of upright support 20 is lowered until sheet 35 is placed on the rim of mold 3. The vacuum in tube 24 is broken by a valve (not shown) or simply by deenergizing electric motor 34 of vacuum pump 30. The motor 16 is started and molding commences.

Because of the very rapid heating of even very heavy sheet material by the apparatus of the invention, a single oven or heating station can serve two molding stations. The rate of output is no longer controlled, and impeded, by the output of the heating station. The overall cycle period of operations is sharply reduced and the time of the operator is utilized most economically. Transfer of the heated sheet from the carriage plate 40 is additionally speeded up by the provision of means for injecting air between reflecting face 41 and sheet 35 by way of recesses 57.

Because of the reliable, rapid, and uniform heating effect achieved by the method of the invention, the apparatus performing the method may readily be equipped for semi-automatic or fully automatic operation. Movements of the carriage plate 40 and of the two transfer devices on the brackets 23 are readily actuated by electric motors, hydraulic or pneumatic actuators known in themselves, which can be controlled by rotary time switches which open and close the circuits of the electrically energized actuators, motors and heating elements of the apparatus in predetermined sequence either directly or by means of relays in a manner well known in itself. The time switches may also control solenoid or motor valves in the necessary pressure fluid lines. The action of the operator then is limited to supervising the operation of the machine, and to feeding blank sheets, and removing completed moldings. As is well known, even these feeding and discharging operations can be mechanized.

Various modifications are contemplated and may obviously be resorted to by those skilled in the art without departing from the spirit and scope of the invention as hereinafter defined by the appended claims, as only a preferred embodiment of the invention has been disclosed.

What is claimed is:
1. A device for heating a sheet of synthetic thermoplastic material, comprising a support; carrier means for supporting a plastic sheet thereon in a predetermined plane, said carrier means being movable on said support toward and away from a predetermined position and including a reflecting face portion contiguously adjacent said plane and adapted to carry a plastic sheet thereon; heater means on said carrier means in thermal contact with said reflecting face portions; and a source of thermal radiation mounted on said support for radiating thermal energy toward said face portion when said carrier means is in said predetermined position.

2. A device for heating a sheet of synthetic thermoplastic material, comprising a support; a source of fluid under pressure; carrier means for supporting a plastic sheet thereon in a predetermined plane, said carrier means being movable on said support toward and away from a predetermined position and including a reflecting face portion contiguously adjacent said plane and adapted to carry a plastic sheet thereon, and conduits communicating with said source of fluid and having orifices in said reflecting portion; and a source of thermal radiation mounted on said support for radiating thermal energy toward said face portion when said carrier means is in said predetermined position.

References Cited in the file of this patent
UNITED STATES PATENTS

| | | |
|---|---|---|
| 1,802,407 | Danninger et al. | Apr. 28, 1931 |
| 2,318,533 | Selvig | May 4, 1943 |
| 2,349,300 | Olsen | May 23, 1944 |
| 2,354,658 | Barber | Aug. 1, 1954 |
| 2,694,131 | Carson | Nov. 9, 1954 |
| 2,935,594 | Christenson | May 3, 1960 |